United States Patent
Wang et al.

(10) Patent No.: US 12,291,622 B2
(45) Date of Patent: May 6, 2025

(54) METHOD FOR PREPARING WPU SYNTHETIC LEATHER FOAMING LAYERS BASED ON PICKERING FOAM TEMPLATE METHOD

(71) Applicant: Sichuan University, Chengdu (CN)

(72) Inventors: Chunhua Wang, Chengdu (CN); Wei Lin, Chengdu (CN); Ngai To, Chengdu (CN); Yifeng Sheng, Chengdu (CN); Jianhui Wu, Chengdu (CN)

(73) Assignee: Sichuan University, Chengdu (CN)

( * ) Notice: Subject to any disclaimer, the term of this patent is extended or adjusted under 35 U.S.C. 154(b) by 827 days.

(21) Appl. No.: 17/495,010

(22) Filed: Oct. 6, 2021

(65) Prior Publication Data
US 2022/0185984 A1 Jun. 16, 2022

(30) Foreign Application Priority Data
Dec. 11, 2020 (CN) .......................... 202011443882.0

(51) Int. Cl.
| | |
|---|---|
| *C08J 9/28* | (2006.01) |
| *C08G 18/08* | (2006.01) |
| *C08G 18/12* | (2006.01) |
| *C08G 18/32* | (2006.01) |
| *C08G 18/34* | (2006.01) |
| *C08G 18/48* | (2006.01) |
| *C08G 18/66* | (2006.01) |
| *C08G 18/75* | (2006.01) |
| *C08J 9/00* | (2006.01) |
| *D06N 3/00* | (2006.01) |
| *D06N 3/14* | (2006.01) |

(52) U.S. Cl.
CPC .............. *C08J 9/286* (2013.01); *C08G 18/12* (2013.01); *C08G 18/14* (2013.01); *C08G 18/3206* (2013.01); *C08G 18/348* (2013.01); *C08G 18/4854* (2013.01); *C08G 18/6607* (2013.01); *C08G 18/6692* (2013.01); *C08G 18/755* (2013.01); *C08J 9/0066* (2013.01); *D06N 3/0043* (2013.01); *D06N 3/148* (2013.01); *C08J 2375/08* (2013.01); *D06N 2205/04* (2013.01)

(58) Field of Classification Search
CPC .... C08G 18/0852; C08G 18/10; C08G 18/12; C08G 18/14; C08G 18/3206; C08G 18/348; C08G 18/3819; C08G 18/4854; C08G 18/61; C08G 18/6541; C08G 18/6607; C08G 18/6674; C08G 18/6692; C08G 18/755; C08G 2101/00; C08G 2110/0083; C08J 9/0014; C08J 9/0066; C08J 9/28; C08J 9/286; C08J 2375/04; C08J 2375/08; D06N 3/0043; D06N 3/146; D06N 3/147; D06N 3/148; D06N 2205/04

See application file for complete search history.

(56) References Cited

FOREIGN PATENT DOCUMENTS

| | | | | |
|---|---|---|---|---|
| CN | 108410345 A | * | 8/2018 | |
| WO | WO-2018159359 A1 | * | 9/2018 | ......... C08G 18/0823 |
| WO | WO-2019054104 A1 | * | 3/2019 | ............... C08K 3/26 |

* cited by examiner

*Primary Examiner* — John M Cooney
(74) *Attorney, Agent, or Firm* — Shih IP Law Group, PLLC

(57) ABSTRACT

The disclosure provides a new method for preparing a WPU synthetic leather foaming layer based on a Pickering foam template method. The key of the method is to use the soft waterborne polyurethane as raw materials, add waterborne crosslinking agent and hydrophobic inorganic solid particles as Pickering waterborne foam stabilizers to obtain Pickering waterborne foam slurry of polyurethane latex particles through high-speed emulsification; and dry the slurry to obtain the waterborne polyurethane foam layer. The preparation process does not use any organic solvents, is clean and environmentally-friendly, and is simple to operate, making it easier to realize industrialized production. In addition, the Pickering foam has strong interface stability, which effectively solves the problem of difficult adjustment of the pore size caused by the accumulation and collapse of bubbles during the drying process of the mechanical foaming method, and the prepared synthetic leather foam layer has good hygienic properties.

5 Claims, No Drawings

METHOD FOR PREPARING WPU SYNTHETIC LEATHER FOAMING LAYERS BASED ON PICKERING FOAM TEMPLATE METHOD

CROSS REFERENCE TO RELATED APPLICATION

This patent application claims the benefit and priority of Chinese Patent Application No. 202011443882.0 filed on Dec. 11, 2020, the disclosure of which is incorporated by reference herein in its entirety as part of the present application.

TECHNICAL FIELD

The present disclosure belongs to the field of waterborne synthetic leather manufacturing, and specifically relates to a new method for preparing a WPU synthetic leather foaming layer based on a Pickering foam template method.

BACKGROUND ART

With the development of the economy and the improvement of people's living, the demand for leather products is increasing; however, natural leather cannot meet the increasing demand of people due to the limited source of raw materials. In addition, the leather production process will cause serious pollution to the environment. In order to solve these problems, scientists have begun to research and develop alternative materials for natural leather, and have successively developed artificial leather and synthetic leather. Synthetic leather is a composite product that simulates the structure and performance of natural leather, which is usually a composite product produced with polyurethane resin as the coating material, with impregnated non-woven fabric and superfine fiber base fabric as the base layer, its surface is very similar to leather, and is closer to natural leather than ordinary artificial leather. It can be widely used in the production of shoes, boots, bags and balls, etc. In recent years, the synthetic leather industry in China has developed rapidly and China has gradually become a major producer and exporter of synthetic leather products. One of the differences between synthetic leather and natural leather is that natural leather is woven with skin collagen fibers, which is porous and has good hygienic properties. Synthetic leather is a high-molecular resin processing and molding material, so it is necessary to form a pore structure through the adjustment of the production process to make it have a certain degree of air permeability. At present, most of polyurethane synthetic leather enterprises in China use solvent-based production systems. It requires a large amount of volatile organic compounds (VOCs) in the manufacturing process, especially the use of N, N-dimethylformamide (DMF). This is also the essential reason for the "three highs" (high pollution, high energy consumption, and high risk) in the synthetic leather industry. On the one hand, whether it is a wet process, a dry process, or a finishing process, it will produce a large amount of solvents that are difficult to recover. In the process of DMF recovery, DMF will also be decomposed and release highly toxic gases such as dimethylamine, which will cause serious pollution to the environment. On the other hand, in the $H_2O$-DMF coagulation bath in the traditional solvent-based polyurethane synthetic leather manufacturing process, water cannot completely replace the DMF in the solvent-based PU, which will cause the residual DMF in the synthetic leather to exceed the standard, resulting in product safety issues. The residue of DMF will not only damage the health of consumers, but also make products subject to technical and trade barriers in export. Especially with the development of synthetic leather, the pollution of DMF has gradually aroused attention, so there is an urgent need to seek new low-energy, environmentally-friendly polyurethane synthetic leather manufacturing technology.

Waterborne polyurethane (WPU) synthetic leather, which is developed rapidly to meet the requirements of environmental protection, is an ideal substitute of traditional solvent-based polyurethane in synthetic leather industry because of using water as the solvent and no releasing of poisonous gas in production process. Therefore, it has become an ideal substitute for traditional solvent-based polyurethane in the synthetic leather industry, and gets more and more attention. However, waterborne polyurethane cannot obtain a foamed layer with a highly elastic microporous structure by means of traditional wet process. The waterborne polyurethane synthetic leather produced by the dry process has a flat structure, poor moisture permeability and insufficient elasticity, and cannot achieve the fullness and touch of the leather, and cannot meet the needs of people's lives. Waterborne polyurethane foaming technology has always been one of the key technologies restricting the development of the industry and has attracted much attention in recent years.

In the existing waterborne polyurethane foaming technology, mechanical foaming technology (such as CN107354761) has too high process requirements, poor foaming stability, and large fluctuations between different batches; and it is difficult to be stored for a long time after foaming, and the cells are basically closed cells, the cells are small and messy, the hand feel is not adjustable, and the water and alkali resistance is poor, which leads to the limited application of the product. The foaming agent used by chemical foaming method generally needs a relatively high temperature, the process of bubble generation requires a lot of heat, the decomposition speed is difficult to control, clusters are easy to occur, thus affecting the aperture, and the decomposition reaction will produce toxic gas and some solid waste, there is a great potential security risks. The core of the microsphere foaming technology (such as patent application CN102504688A) is the foamed microspheres, but the microsphere foaming agent is relatively expensive, and companies in China basically do not produce them, mainly relying on imports. In addition, the presence of thermoplastic expanded microspheres will adversely affect the performance of polyurethane synthetic leather. Therefore, it is necessary to develop a new foaming method to produce waterborne polyurethane synthetic leather.

In recent years, Pickering foam stabilized with solid particles has attracted much attention because of its unique self-assembly effect of interfacial particles and strong interfacial stability. The Pickering foam template method developed based on this has become a new way to manufacture porous materials. The Pickering waterborne foam template method uses water as the continuous phase, air as the dispersed phase, and solid particles as the foam stabilizer. The preparation process does not use any organic solvents and surfactants. The purpose of the present disclosure is to combine the Pickering waterborne foam template method with the production of the waterborne polyurethane synthetic leather foaming layer in view of the shortcomings and defects of the existing waterborne polyurethane foaming technology, and provide a new method for preparing a WPU synthetic leather foaming layer based on a Pickering foam template method. According to literature research, there has not been any literature or patent report on the preparation of waterborne polyurethane synthetic leather foam layer by this method.

SUMMARY

The purpose of the present disclosure is to provide a new method for preparing a WPU synthetic leather foam layer based on the Pickering foam template method. The preparation uses the Pickering waterborne foam template method, using soft waterborne polyurethane as raw materials, adding waterborne crosslinking agent and hydrophobic inorganic solid particles as foam stabilizers to obtain Pickering waterborne foam slurry of polyurethane latex particles through high-speed emulsification; and drying the slurry to obtain the waterborne polyurethane foam layer. The preparation process does not use any organic solvents, is clean and environmentally-friendly, and is simple to operate, making it easier to realize industrialized production. The prepared waterborne polyurethane synthetic leather foam layer has good hygienic properties. Specific steps are as follows:

1. A method for preparing a WPU synthetic leather foaming layer based on a Pickering foam template method, comprises the following steps:
    (1) Selecting a soft waterborne polyurethane with a solid content of 20-40% as the raw material for the synthetic leather foam layer, adding a waterborne crosslinking agent thereto, and mixing uniformly to obtain a waterborne polyurethane slurry for synthetic leather;
    (2) Adding the waterborne polyurethane slurry to an open container, then adding hydrophobic inorganic solid particles that can be adsorbed at the water-air interface as a foam stabilizer, the mass ratio of solid nanoparticles and soft waterborne polyurethane for synthetic leather of (0.05-0.2): 1, the volume of the mixed solution in the container of below ½ of the volume of the container, after mixing uniformly, performing emulsifying and dispersing by a high-speed emulsifier for 0.5-2 h with a speed of 8000-15000 rpm/min to obtain a Pickering waterborne foam slurry containing polyurethane latex particles;
    (3) Drying the Pickering waterborne foam slurry at 70-120° C. to obtain a waterborne synthetic leather foaming layer based on a Pickering foam template method;

Wherein, the preparation steps of the soft waterborne polyurethane for synthetic leather are as follows:
    (1) Adding a hard segment monomer diisocyanate and a soft segment monomer polymer diol to a reactor in accordance with the molar ratio of (2-5):1, adding an appropriate amount of solvent acetone, and stirring the reaction for 1 h at the temperature of 60-90° C.; then adding a chain extender (2,2-dimethylolpropionic acid and 1,4-butanediol) and 1-2 drops of catalyst with the molar ratio of chain extender to polymer glycol of (1-4): 1, and conducting the reaction at the temperature of 70-90° C. for 3-6 h with a stirring speed of 100-2000 rpm to obtain a polyurethane polymer; In the preparation process, adjusting the ratio of dimethylolpropionic acid to 1,4-butanediol to make the amount of dimethylolpropionic acid of 4-6 wt % (percentage) of all the reactants added;
    (2) Adding triethylamine to the reactor, performing the neutralization for 0.5-2 h at a temperature of 40-50° C. and a stirring speed of 1000-2000 rpm, adjusting the pH to 3-10; finally adding a certain amount of deionized water to the reaction product, stirring for 10-30 min at the stirring speed of 8000-10000 rpm; and stirring for 1-2 h at the stirring speed of 1000-3000 rpm;
    (3) Removing acetone by rotary evaporation, and concentrating the product to the solid content of 20%-40% to obtain the soft waterborne polyurethane for synthetic leather.

The soft waterborne polyurethane is a waterborne polyurethane with an elastic modulus of 20-45 MPa, the particle size is 50-300 nm, and the residual organic solvent content is less than 2% (by weight).

The soft segment monomer polymer diol used in the preparation of soft waterborne polyurethane is one of polyether polyol, polyester polyol, hydroxy-terminated polysiloxane, and hydroxy-terminated polylactic acid with a molecular weight of 2000-10,000; the hard segment monomer diisocyanate is one of isophorone diisocyanate (IPDI) and hexamethylene diisocyanate (HDI); and the soft segment content of the polyurethane calculated by the added mass of the soft segment monomer and the hard segment monomer is 50-65 wt %.

The waterborne crosslinking agent is one of polycarbodiimide, polyaziridine, and epoxy resin.

The foam stabilizer is a hydrophobic solid particle with a particle diameter of 10 nm-5 μm, including one of hydrophobic $SiO_2$ particles, clay and styrene particles, and the surface contact angle of the solid particles is 100-150°.

The method for preparing waterborne synthetic leather provided by the present disclosure has the following advantages:
    (1) In the present disclosure, the Pickering waterborne foam template method is used to prepare the waterborne polyurethane synthetic leather foam layer. The method uses water as the continuous phase and air as the dispersed phase. The preparation process does not use any organic solvents, and no toxic gas is generated during the foaming process, which is a clean and environmentally-friendly production method.
    (2) The preparation method of the foamed layer provided in the present disclosure is prepared by mixing a solid particle stabilizer and a waterborne polyurethane slurry, emulsifying at high speed, and then drying to form pores. The method is simple to operate and easy to realize industrialized production.
    3) The principle of the Pickering waterborne foam template method used in the present disclosure is to use the self-assembly of hydrophilic polyurethane latex particles and hydrophobic solid inorganic particles at the interface to prepare Pickering waterborne foam, and use it as a template to prepare synthetic leather polyurethane foam layer. Because the two are adsorbed at the interface to form a double-layer solid particle film with a Janus structure, the Pickering foam obtained has strong stability, which effectively solves the problem of difficult adjustment of the pore size caused by the accumulation and collapse of bubbles in the drying process of the existing physical mechanical foaming method, and the prepared synthetic leather foam layer has good hygienic properties.
    (4) In the present disclosure, the Pickering waterborne foam stabilizer—the hydrophobic inorganic solid particles act as a stabilizer in the initial water system, and can be used as a filling enhancer in the polyurethane foam layer after drying, which can improve the mechanical properties of the foamed layer.

DETAILED DESCRIPTION OF THE EMBODIMENTS

Three examples of the present disclosure are given below to illustrate the preparation method in detail.

Example 1

20.00 g of the polytetrahydrofuran ether (Mn=2000) was added to the reactor, isophorone diisocyanate (IPDI) and 300 ml of acetone were added to the reactor, and mechanically stirred under nitrogen protection at 70° C. for 1 h. 2.68 g of 2,2-dimethylolpropionic acid and 1.8 g of 1,4 butanediol and 1 drop of catalyst were added thereto, and stirred at 80° C. for 4 h. The neutralization agent was added to conduct the neutralization for 1 h at the temperature of 40° C. and the stirring speed of 2000 rpm, and the pH was adjusted to be 9. The reaction product was evaporated to remove the acetone and concentrated to a solid content of 70%-80%. High-purity deionized water was added to the reactant, and the mixture was stirred and emulsified at a high speed for 0.5 h with the stirring speed of 8000 rpm, and the mixture was stirred at a low speed for 1 h with the stirring speed of 3000 rpm, and the mixture was concentrated by rotary evaporation to obtain a soft waterborne polyurethane for synthetic leather with a solid content of 20%.

100 g of synthetic leather soft waterborne polyurethane with a solid content of 20% was weighed, 1.0 g of waterborne crosslinking agent was added and mixed uniformly to obtain the waterborne polyurethane slurry for bottom layer; then 10 g of hydrophobic $SiO_2$ solid particles with the particle size of 50 nm and the surface contact angle of 120° was added thereto. The mixed solution was emulsified and dispersed by a high-speed emulsifier for 0.5 h at a dispersion speed of 10000 rpm/min to obtain a Pickering waterborne foam containing polyurethane latex particles; then dried at 70° C. to obtain the synthetic leather waterborne polyurethane foam layer prepared based on the Pickering foam template method.

Example 2

20.00 g of the polytetrahydrofuran ether (Mn=2000) was added to the reactor, isophorone diisocyanate (IPDI) and 200 ml of acetone were added to the reactor, and mechanically stirred under nitrogen protection at 70° C. for 1 h. 2.68 g of 2,2-dimethylolpropionic acid and 1.8 g of 1,4 butanediol and 1 drop of catalyst were added thereto, and stirred at 80° C. for 4 h. The neutralization agent was added to conduct the neutralization for 1 h at the temperature of 40° C. and the stirring speed of 2000 rpm, and the pH was adjusted to be 9. The reaction product was evaporated to remove the acetone and concentrated to a solid content of 70%-80%. High-purity deionized water was added to the reactant, and the mixture was stirred and emulsified at a high speed for 0.5 h with the stirring speed of 8000 rpm, and the mixture was stirred at a low speed for 1 h with the stirring speed of 3000 rpm, and the mixture was concentrated by rotary evaporation to obtain a soft waterborne polyurethane for synthetic leather with a solid content of 30%.

100 g of synthetic leather soft waterborne polyurethane with a solid content of 30% was weighed, 1.5 g of waterborne crosslinking agent was added and mixed uniformly to obtain the waterborne polyurethane slurry for bottom layer; then 15 g of hydrophobic clay solid particles with the particle size of 25 nm and the surface contact angle of 100° was added thereto. The mixed solution was emulsified and dispersed by a high-speed emulsifier for 1 h at a dispersion speed of 10000 rpm/min to obtain a Pickering waterborne foam containing polyurethane latex particles; then dried at 90° C. to obtain the synthetic leather waterborne polyurethane foam layer prepared based on the Pickering foam template method.

Example 3

20.00 g of the hydroxy-terminated polysiloxane (Mn=2000) was added to the reactor, isophorone diisocyanate (IPDI) and 200 ml of acetone were added to the reactor, and mechanically stirred under nitrogen protection at 70° C. for 1 h. 2.68 g of 2,2-dimethylolpropionic acid and 1.8 g of 1,4 butanediol and 1 drop of catalyst were added thereto, and stirred at 80° C. for 4 h. The neutralization agent was added to conduct the neutralization for 1 h at the temperature of 40° C. and the stirring speed of 2000 rpm, and the pH was adjusted to be 9. The reaction product was evaporated to remove the acetone and concentrated to a solid content of 70%-80%. High-purity deionized water was added to the reactant, and the mixture was stirred and emulsified at a high speed for 0.5 h with the stirring speed of 8000 rpm, and the mixture was stirred at a low speed for 1 h with the stirring speed of 3000 rpm, and the mixture was concentrated by rotary evaporation to obtain a soft waterborne polyurethane for synthetic leather with a solid content of 30%.

100 g of synthetic leather soft waterborne polyurethane with a solid content of 430% was weighed, 1.5 g of waterborne crosslinking agent was added and mixed uniformly to obtain the waterborne polyurethane slurry for bottom layer; then 20 g of hydrophobic polystyrene solid particles with the particle size of 1 μm and the surface contact angle of 100° was added thereto. The mixed solution was emulsified and dispersed by a high-speed emulsifier for 2 h at a dispersion speed of 10000 rpm/min to obtain a Pickering waterborne foam containing polyurethane latex particles; then dried at 90° C. to obtain the synthetic leather waterborne polyurethane foam layer prepared based on the Pickering foam template method.

What is claimed is:
1. A method for preparing a waterborne polyurethane synthetic leather foaming layer based on a Pickering foam template method, comprising the following steps:
   (1) selecting a soft waterborne polyurethane with a solid content of 20-40% as a raw material for the waterborne polyurethane synthetic leather foaming layer, adding a waterborne crosslinking agent thereto, and mixing uniformly to obtain a waterborne polyurethane slurry for synthetic leather;
   (2) adding the waterborne polyurethane slurry for synthetic leather to an open container, then adding hydrophobic inorganic solid particles that can be adsorbed at a water-air interface as a foam stabilizer, wherein a mass ratio of the hydrophobic inorganic solid particles to the waterborne polyurethane slurry for synthetic leather is (0.05-0.2): 1, a volume of a mixed solution in the container is below ½ of a volume of the container, and air is used as a dispersed phase; after mixing uniformly, performing emulsifying and dispersing by a high-speed emulsifier for 0.5-2 h with a speed of 8000-15000 rpm/min to obtain a Pickering waterborne foam slurry containing polyurethane latex particles; and

(3) drying the Pickering waterborne foam slurry at 70-120° C. to obtain the waterborne polyurethane synthetic leather foaming layer based on the Pickering foam template method;
wherein the waterborne polyurethane slurry for synthetic leather is prepared by the following steps:
1) adding a hard segment monomer diisocyanate and a soft segment monomer polymer diol to a reactor in accordance with a molar ratio of (2-5):1, adding an appropriate amount of solvent acetone, and stirring and reacting for 1 h at a temperature of 60-90° C.; then adding a chain extender 2,2-dimethylolpropionic acid and 1,4-butanediol and 1-2 drops of a catalyst with a molar ratio of the chain extender to the soft segment monomer polymer diol of (1-4): 1, and conducting a reaction at a temperature of 70-90° C. for 3-6 h with a stirring speed of 100-2000 rpm to obtain a polyurethane polymer; wherein a ratio of the 2,2-dimethylolpropionic acid to the 1,4-butanediol is adjusted to make an amount of the 2,2-dimethylolpropionic acid account for 4-6 wt % of all reactants added;
2) adding triethylamine to the reactor, performing neutralization for 0.5-2 h at a temperature of 40-50° C. and a stirring speed of 1000-2000 rpm, adjusting a pH to 3-10; finally adding a certain amount of deionized water to a resulting reaction product, stirring for 10-30 min at a stirring speed of 8000-10000 rpm; and stirring for 1-2 h at a stirring speed of 1000-3000 rpm; and
3) removing acetone by rotary evaporation, and concentrating a resulting product to a solid content of 20%-40% to obtain the waterborne polyurethane slurry for synthetic leather.

2. The method for preparing the waterborne polyurethane synthetic leather foaming layer based on the Pickering foam template method according to claim 1, wherein the soft waterborne polyurethane is a waterborne polyurethane with an elastic modulus of 20-45 MPa, the particle size is 50-300 nm, and the residual organic solvent content is less than 2% (by weight).

3. The method for preparing the waterborne polyurethane synthetic leather foaming layer based on the Pickering foam template method according to claim 1, wherein the soft segment monomer polymer diol used in the preparation of soft waterborne polyurethane is one of polyether polyol, polyester polyol, hydroxy-terminated polysiloxane, and hydroxy-terminated polylactic acid with a molecular weight of 2000-10,000; the hard segment monomer diisocyanate is one of isophorone diisocyanate (IPDI) and hexamethylene diisocyanate (HDI); and the soft segment content of the polyurethane calculated by the added mass of the soft segment monomer and the hard segment monomer is 50-65 wt %.

4. The method for preparing the waterborne polyurethane synthetic leather foaming layer based on the Pickering foam template method according to claim 1, wherein the waterborne crosslinking agent is one of polycarbodiimide, polyaziridine, and epoxy resin.

5. The method for preparing the waterborne polyurethane synthetic leather foaming layer based on the Pickering foam template method according to claim 1, wherein the foam stabilizer is hydrophobic solid particles with a particle diameter of 10 nm-5 μm, including one of hydrophobic $SiO_2$ particles, clay and styrene particles, and the surface contact angle of the solid particles is 100-150°.

* * * * *